United States Patent
Hachisuka (10) Patent No.: US 8,081,398 B2
(45) Date of Patent: Dec. 20, 2011

(54) THIN-FILM MAGNETIC HEAD HAVING FUNCTION OF ADJUSTING CLOSURE HEIGHT

(75) Inventor: Nozomu Hachisuka, Tokyo (JP)

(73) Assignee: TDK Corporation, Tokyo (JP)

( * ) Notice: Subject to any disclaimer, the term of this patent is extended or adjusted under 35 U.S.C. 154(b) by 924 days.

(21) Appl. No.: 12/100,149

(22) Filed: Apr. 9, 2008

(65) Prior Publication Data

US 2009/0257143 A1    Oct. 15, 2009

(51) Int. Cl.
*G11B 5/23* (2006.01)
*G11B 5/40* (2006.01)
*G11B 5/58* (2006.01)

(52) U.S. Cl. ......... 360/125.31; 360/125.74; 360/125.73; 360/291; 360/241.1; 360/294.7

(58) Field of Classification Search ............. 360/125.31, 360/125.72, 125.74, 241.1, 241.3, 291, 294.7, 360/125.73
See application file for complete search history.

(56) References Cited

U.S. PATENT DOCUMENTS

| 6,122,147 A | 9/2000 | Fahimi et al. |
| 7,542,246 B1 * | 6/2009 | Song et al. .................... 360/319 |
| 7,656,619 B1 * | 2/2010 | Yan et al. .................... 360/294.7 |
| 7,724,480 B1 * | 5/2010 | Guo et al. .................... 360/294.7 |
| 2009/0154024 A1 * | 6/2009 | Hachisuka et al. ........... 360/313 |
| 2009/0310248 A1 * | 12/2009 | Hachisuka .................... 360/77.01 |

FOREIGN PATENT DOCUMENTS

| JP | A 9-198829 | 7/1997 |
| JP | A 2004-295951 | 10/2004 |
| JP | A 2006-31817 | 2/2006 |

* cited by examiner

*Primary Examiner* — Jefferson Evans
(74) *Attorney, Agent, or Firm* — Oliff & Berridge, PLC (57) ABSTRACT

Provided is a thin-film magnetic head, in which the magnetic spacing can be controlled appropriately, regardless of the presence of the variation in height of the medium-opposed surface of the closure. The thin-film magnetic head includes: at least one head element formed on or above an element-formation surface of a substrate, for reading data from a magnetic recording medium and/or writing data to a magnetic recording medium; an overcoat layer formed on the element-formation surface so as to cover the at least one head element; and at least one closure adhered to at least a portion of an upper surface of the overcoat layer. Here, at least one of the at least one closure includes at least one element for adjusting the height of a medium-opposed surface of the closure. The element is preferably a heating element provided within the closure.

21 Claims, 9 Drawing Sheets

THIN-FILM MAGNETIC HEAD HAVING FUNCTION OF ADJUSTING CLOSURE HEIGHT

BACKGROUND OF THE INVENTION

1. Field of the Invention

The present invention relates to a thin-film magnetic head for applying to magnetic recording, especially relates to a tape head for writing data to a magnetic tape and reading data from the tape. The present invention further relates to a magnetic tape apparatus having the tape head. Furthermore, the present invention relates to a controlling method of magnetic spacing, which is a distance between the ends of head elements in the thin-film magnetic head and the surface of the magnetic recording layer of a magnetic recording medium.

2. Description of the Related Art

In recent years, magnetic recording and reproducing apparatuses have been remarkably improved in capacity of storage data, corresponding to the widespread use of multimedia and the Internet. And magnetic tape apparatuses, for example, for backing up or storing data or for recording and reproducing audio video information are no exception of this trend of larger capacity, and have been required to be improved in areal recording density corresponding to the larger capacity.

Thin-film magnetic heads are widely used, in the above-described magnetic recording and reproducing apparatuses, for writing data to a magnetic recording medium and reading data from the medium. The thin-film magnetic heads have also been strongly required to be improved in performance corresponding to the larger capacity. Especially, significantly required is to appropriately control a magnetic spacing in order to stably perform read and write operations under higher recording density and to maintain original lifetime of the thin-film magnetic head. Here, the magnetic spacing is defined as a distance between the ends of head elements in the thin-film magnetic head and the surface of the magnetic recording layer of a magnetic recording medium.

As a measure for positively controlling the magnetic spacing, Japanese Patent Publication No. 2006-031817A describes a technique in which the head end surface is protruded toward the magnetic disk by the heat generated from a heater provided within the thin-film magnetic head for magnetic disk apparatuses. Further, Japanese Patent Publication No. 09-198829A describes a technique for dissolving the adsorption between the head and the magnetic disk by using a heater.

Also in the thin-film magnetic head for magnetic tape apparatuses (tape head), it is significantly important to adjust the degree of contact between the tape head and the magnetic tape, and thus to appropriately control the magnetic spacing. As an example of intending to control the magnetic spacing, Japanese Patent Publication No. 2004-295951A describes a technique of utilizing a negative-pressure slider for hard disks. Further, U.S. Pat. No. 6,122,147 (Japanese Patent Publication No. 2000-207800A) discloses a technique in which cavities are provided in a tape bearing surface (TBS), which is a medium-opposed surface or a sliding surface, and the cavities deform portions of the magnetic tape that passes above the cavities, to stabilize the contact between the magnetic head and the magnetic tape.

However, there has been a problem that the magnetic spacing is likely to vary due to the change in shape of the medium-opposed surface of the thin-film magnetic head, the change generated by the contact between the head and the medium. Especially, the tape head slides on the magnetic tape during read and write operations. Therefore, the shape of the tape bearing surface (TBS), which is a medium-opposed surface as well as a sliding surface, varies over time due to the friction with the magnetic tape. The variation of the shape becomes larger in the case that the magnetic tape contains abrasive. In addition, the just-described problem may become more serious due to the error in adhering position of a closure occurred when the closure is adhered during manufacturing process of the tape head.

In the process of manufacturing the head, the error in adhering position which occurs when the closure is adhered on an overcoat layer is generally on the order of several hundred nm (nanometers). After the adhesion, lapped are the surfaces on the side opposed to the medium of the closure and overcoat layer. Even so, the thus-formed medium-opposed surfaces of the closure and overcoat layer have positions different from each other. That is, a step of the order of at least several nanometers (nm) is generated in the boundary between the closure and the overcoat layer. Here, in the case that, as the result of adhering and lapping, the height of the medium-opposed surface of the closure becomes larger than the desired one, that is, in the case that the medium-opposed surface of the closure is more protruded toward the magnetic tape, the magnetic spacing may become larger, which would be likely to cause the read output to be decreased, or to cause the peak steepness of the read signal to be degraded. Whereas, in the case that the height of the medium-opposed surface of the closure becomes smaller than the desired one, the lifetime of the tape head would be likely to be reduced because the magnetic spacing excessively decreases due to the wear of the head elements generated from the increase in the degree of contact between the head elements and the magnetic tape. Further, the head performance may be degraded due to frictional heat generated by the contact.

Here, the height of the medium-opposed surface of the closure is defined as a distance from the medium-opposed surface of the overcoat layer to the medium-opposed surface of the closure in the direction perpendicular to the medium-opposed surface of the closure (height direction). The height is exemplified by $H_{CO}$ in FIG. 4a attached to the present specification.

BRIEF SUMMARY OF THE INVENTION

Therefore, an object of the present invention is to provide a thin-film magnetic head, in which the magnetic spacing can be controlled appropriately, regardless of the presence of the variation in height of the medium-opposed surface of the closure derived from the variation in adhering position of the closure: and to provide a magnetic tape apparatus provided with the thin-film magnetic head.

Another object of the present invention is to provide a method for controlling the magnetic spacing appropriately, regardless of the presence of the variation in height of the medium-opposed surface of the closure derived from the variation in adhering position of the closure.

Before describing the present invention, terms used herein will be defined. In a multilayer structure of element(s) formed on or above the element-formation surface of the substrate in a thin-film magnetic head, a layer located on the substrate side in relation to a standard layer is referred to as being located "lower" than, "beneath" or "below" the standard layer, and a portion on the substrate side of a layer is referred to as a "lower" portion. Further, a layer located on the stacking direction side (the opposite side to the substrate) in relation to a standard layer is referred to as being located "upper" than, "on" or "above" the standard layer, and a portion on the stacking direction side of a layer is referred to as an "upper" portion.

Further, the height of the medium-opposed surface of closure or substrate is defined as a distance from the medium-opposed surface of overcoat layer to the medium-opposed surface of closure or substrate, in the direction perpendicular to the medium-opposed surface of closure or substrate (the direction defined as "height direction" hereinafter). As the result of the definition, for example, the more protruded is the whole or a portion of the medium-opposed surface of closure toward the magnetic recording medium, the higher becomes the whole or the portion of the surface. In particular, the height of the medium-opposed surface 1002 of the closure 24 is shown as $H_{C0}$ in FIG. 4a, and is shown as $H_C$ in FIG. 4b.

According to the present invention, a thin-film magnetic head is provided, which comprises: at least one head element formed on or above an element-formation surface of a substrate, for reading data from a magnetic recording medium and/or writing data to a magnetic recording medium; an overcoat layer formed on the element-formation surface so as to cover the at least one head element; and at least one closure adhered to at least a portion of an upper surface of the overcoat layer, and at least one of the at least one closure comprising at least one height-adjusting means for adjusting the height of a medium-opposed surface of the closure.

In the above-described thin-film magnetic head, using the height-adjusting means enables the height of the medium-opposed surface of the closure to be adjusted. As a result, also can be adjusted is the degree of contact between the magnetic recording medium and a portion of the medium-opposed surface near the end of the head element. Therefore, the magnetic spacing can be controlled appropriately, regardless of the presence of the variation in height of the medium-opposed surface of the closure derived from the variation in adhering position of the closure generated during the manufacturing process of the head. Here, the magnetic spacing is defined as a distance between the end of head element in the thin-film magnetic head and the surface of the magnetic recording layer of the magnetic recording medium.

In the thin-film magnetic head according to the present invention, the at least one height-adjusting means is preferably at least one heating means provided within the closure. In this case, the heating means generates heat, by which a portion of closure surrounding the heating means thermally expands. Therefore, the medium-opposed surface of the closure can be protruded toward the magnetic recording medium. Alternatively, the at least one height-adjusting means is also preferably at least one piezoelectric element provided within the closure.

Further, in the thin-film magnetic head according to the present invention, it is preferable that: the at least one head element is a plurality of read head elements aligned in a track width direction for reading data and a plurality of write head elements aligned in the track width direction for writing data; and the at least one height-adjusting means comprises a heating portion with a length in the track width direction being the same as or more than a length of a range in the track width direction in which all the read head elements and the write head elements are aligned.

Further, it is also preferable that: the at least one head element is a plurality of read head elements aligned in a track width direction for reading data and a plurality of write head elements aligned in the track width direction for writing data; and a plurality of height-adjusting means is aligned in the track width direction within the closure. In this case, a plurality of height-adjusting means enables the distribution of protrusion of the medium-opposed surface in the track width direction to be controlled. That is, controlled can be the magnetic spacing at each position of the read head elements and write head elements, which can compensate the variation in the track width direction of performances of elements.

Further, in the thin-film magnetic head according to the present invention, it is also preferable that: provided is a portion of a medium-opposed surface of said at least one closure, the portion protruding toward the magnetic recording medium and extending in the track width direction, a height of the portion being larger than its surrounding; and the at least one height-adjusting means is provided for adjusting the height of the portion of the medium-opposed surface. In this case, the portion of the medium-opposed surface is preferably an end portion of the medium-opposed surface of the closure, the end portion being on a side opposite to said overcoat layer. Further, the portion of the medium-opposed surface is preferably a surface of a protruded layer stacked on the medium-opposed surface of the closure. The protruded portion contacts much strongly with the magnetic recording medium such as a magnetic tape. Providing the protruded portion enables the magnetic spacing to be controlled more efficiently.

Further, in the thin-film magnetic head according to the present invention, it is also preferable that: an additional closure is further adhered on an end surface of the substrate, the end surface being on a side opposite to said overcoat layer; provided is a portion of a medium-opposed surface of each of the closure and the additional closure, the portion protruding toward the magnetic recording medium and extending in the track width direction, a height of the portion being larger than its surrounding; and the at least one height-adjusting means is provided within each of the closure and the additional closure, for adjusting the height of the portion of the medium-opposed surface. In this case, the portion of the medium-opposed surface is preferably an end portion of the medium-opposed surface of each of the closure and the additional closure, the end portion being on a side opposite to the substrate. Further, the portion of the medium-opposed surface is also preferably a surface of a protruded layer stacked on the medium-opposed surface of each of the closure and the additional closure.

According to the present invention, a thin-film magnetic head is further provided, which comprises a first head part and a second head part, the first and second head parts opposed to each other in a direction along track, each of the first and second head parts comprising: at least one head element formed on or above an element-formation surface of a substrate, for reading data from a magnetic recording medium and/or writing data to a magnetic recording medium; an overcoat layer formed on the element-formation surface so as to cover the at least one head element; and a closure adhered to at least a portion of an upper surface of the overcoat layer, and each of the closures of the first and second head parts comprising at least one height-adjusting means for adjusting the height of a medium-opposed surface of the closure.

In this thin-film magnetic head, the values of magnetic spacing of the first and second head parts are balanced therebetween, in the case that the first head part is on the trailing side (the second head part is on the leading side) with respect to the moving magnetic recording medium or in the reverse case.

Further, in the thin-film magnetic head comprising the first and second head parts, it is preferable that: the first and second head parts are opposed to each other in the direction along track, the closure of each of the first and second head parts being positioned outside; provided is a portion of a medium-opposed surface of the closure of each of the first and second head parts, the portion protruding toward the magnetic recording medium and extending in the track width direction, a height of the portion being larger than its surrounding; and the at least one height-adjusting means is provided within the closure of each of the first and second head parts, for adjusting the height of the portion of the medium-opposed surface. In this case, the portion of the medium-opposed surface is preferably an end portion of the medium-opposed surface of the closure of each of the first and second head parts, the end portion being on a side opposite to said overcoat layer. Further, the portion of the medium-opposed surface is also preferable a surface of a protruded layer stacked on the medium-opposed surface of the closure of each of the first and second head parts.

The protruded portion of the closure of each of the first and second head parts contacts much strongly with the magnetic recording medium such as a magnetic tape. Thus, providing the height-adjusting means for adjusting protruded portions enables the magnetic spacing to be controlled more efficiently.

According to the present invention, a magnetic tape apparatus is further provided, which comprises: at least one magnetic tape; at least two reels for feeding and/or winding the at least one magnetic tape; at least one thin-film magnetic head for reading data from said at least one magnetic tape and/or writing data to said at least one magnetic tape; and a recording and/or reproducing control circuit for controlling read and/or write operation performed by said at least one thin-film magnetic head, the thin-film magnetic head comprising: at least one head element formed on or above an element-formation surface of a substrate, for reading data from a magnetic recording medium and/or writing data to a magnetic recording medium; an overcoat layer formed on the element-formation surface so as to cover the at least one head element; and a closure adhered to at least a portion of an upper surface of the overcoat layer, the closure comprising at least one height-adjusting means for adjusting the height of a medium-opposed surface of the closure, and the magnetic tape apparatus further comprising a recording/reproducing and closure-height control circuit, for controlling read and/or write operations of the thin-film magnetic head, and further controlling operations of said at least one height-adjusting means.

According to the present invention, a controlling method of a magnetic spacing is further provided, which comprises the step of adjusting a height of a medium-opposed surface of a closure provided in a thin-film magnetic head, by using at least one height-adjusting means provided within the closure. By using this method, the magnetic spacing can be controlled appropriately, regardless of the presence of the variation in height of the medium-opposed surface of the closure derived from the variation in adhering position of the closure.

In the method for controlling the magnetic spacing, a distribution of protrusion in a track width direction of the medium-opposed surface is preferably controlled by controlling a plurality of height-adjusting means independently of one another, the plurality of height-adjusting means being provided within the closure and aligned in the track width direction.

According to the present invention, a controlling method of a magnetic spacing is further provided, which comprises the steps of: adjusting a height of a medium-opposed surface of a closure provided in each of a first head part and a second head part, the first and second head parts being provided in a thin-film magnetic head, by controlling at least one height-adjusting means provided within the closure of each of the first and second head parts, independently of each other; and balancing a magnetic spacing of the first head part and a magnetic spacing of the second head part.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements is set to be arbitrary for viewability.

DETAILED DESCRIPTION OF THE INVENTION

Figure 1A:
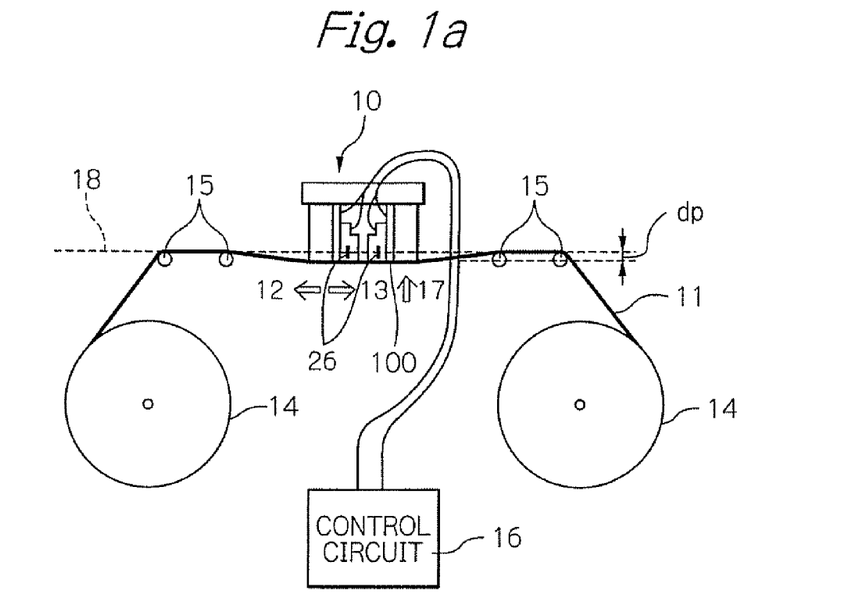
FIG. 1a shows a schematic view illustrating the main part of one embodiment of the magnetic tape apparatus according to the present invention.
Figure 1B:
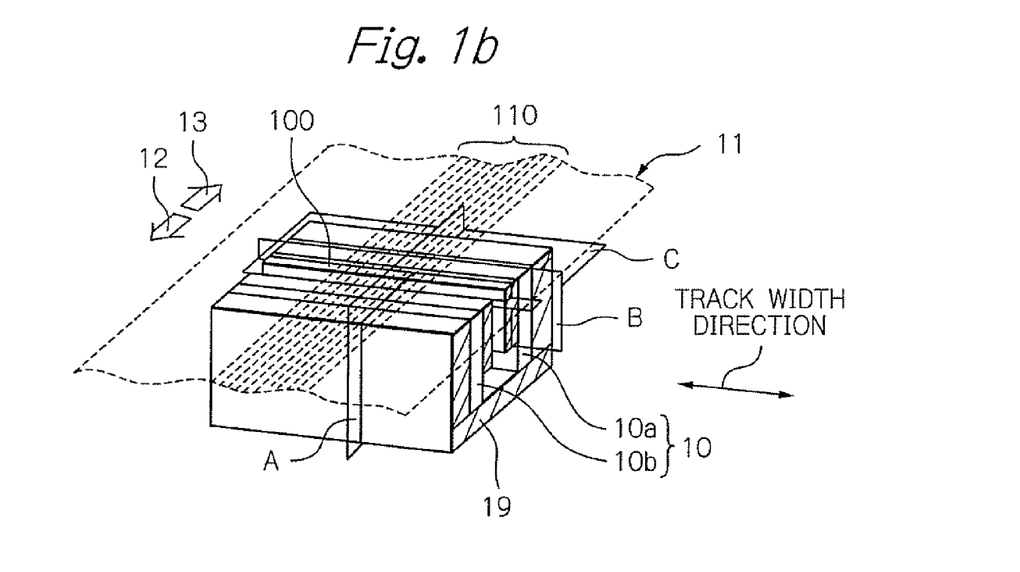
FIG. 1b shows a perspective view schematically illustrating one mode of the configuration of the thin-film magnetic head according to the present invention and the magnetic recording medium.

FIG. 1a shows a schematic view illustrating the main part of one embodiment of the magnetic tape apparatus according to the present invention. And FIG. 1b shows a perspective view schematically illustrating one mode of the configuration of the thin-film magnetic head according to the present invention and the magnetic recording medium.

As shown in FIG. 1a, the magnetic tape apparatus of the present embodiment includes: a magnetic tape 11 as a magnetic recording medium; a tape head 10 as a thin-film magnetic head for performing read and write operations to the magnetic tape 11; reels 14 for feeding (unwinding) and winding the magnetic tape 11; guide pins 15 for guiding the running of the magnetic tape 11; and a recording/reproducing and closure-height control circuit 16.

The tape head 10 is provided for reading and writing data signals, whose tape baring surface (TBS) 100, which is the end surface on the magnetic tape 11 side or a medium-opposed surface (opposed-to-medium surface), is contacted with the magnetic tape 11 running in the direction of arrow 12 or 13. That is, the TBS 100 of the tape head 10 acts as a sliding surface.

The tape head 10 and the guide pins 15 are positioned so that a predetermined suppress force 17 works to cause the tape head 10 and magnetic tape 11 to head toward each other. The suppress force 17 can be adjusted by the distance (penetration) $d_P$ by which the tape head 10 is held down from the common tangent line 18 drawn on the tape-contact sides of the guide pins 15. The adjustment of the suppress force 17 is performed in order to obtain a certain magnetic spacing due to the contact between the tape head 10 and magnetic tape 11. Here, a magnetic spacing is defined as a distance between the ends of the head elements of the tape head 10 and the surface of the magnetic recording layer of the magnetic tape 11. As described in detail later, the tape head 10 includes a heating element 26 as a height-adjusting means for adjusting the height of the medium-opposed surface (TBS) of the closure, which enables the magnetic spacing to be controlled appropriately, regardless of the presence of the variation in height of the medium-opposed surface of the closure derived from the variation in adhering position of the closure.

The recording/reproducing and closure-height control circuit 16 is provided for controlling the read and/or write operations of the tape head 10, and further controlling operations of the above-described heating element 26 as a height-adjusting means.

As shown in FIG. 1b, the magnetic tape 11 has a plurality of tracks 110. The tape head 10 includes the first head part 10a and the second head part 10b, and a frame 19 that supports both of the head parts. During read and write operations, the magnetic tape 11 runs in the direction of the arrow 12 or 13. The tape head 10 performs data-reading and data-writing operations to the tracks 110 of the magnetic tape 11, the TBS 100 of the head 10 being contacted with the running tape 11. In the case that the magnetic tape 11 runs in the direction of arrow 12, for example, the first head part 10a on the leading side may write and the second head part 10b on the trailing side may read. Whereas, in the case of the tape run in the direction of arrow 13, the head parts may be counterchanged with respect to their read and write operations. As a matter of course, a configuration in which the tape head 10 includes either of the first head part 10a or the second head part 10b is also within the scope of the present invention.

Figure 2:
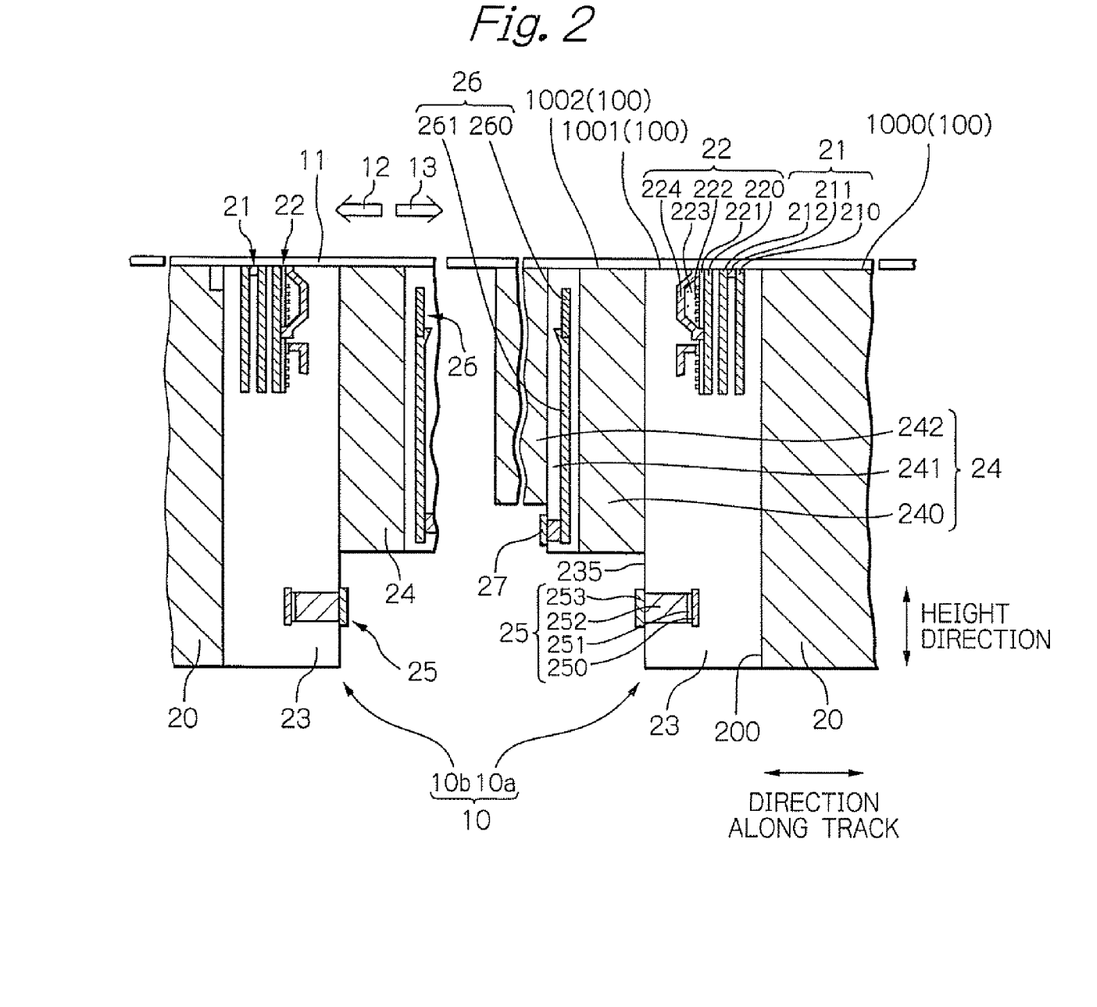
FIG. 2 shows a cross-sectional view taken by plane A shown in FIG. 1b, illustrating a main portion of one embodiment of the thin-film magnetic head according to the present invention.

FIG. 2 shows a cross-sectional view taken by plane A shown in FIG. 1b, illustrating a main portion of one embodiment of the thin-film magnetic head according to the present invention. In FIG. 2, terminal electrodes 25 and 27 may not practically appear on the cross-section taken by the plane A; however, is presented on the cross-section for convenience of explanation. Further, the first and second head parts 10a and 10b of the tape head 10 are opposed to each other in the direction along track, and have the common structure corresponding to each other. Therefore, only the first head part 10a will be explained below.

As shown in FIG. 2, the first head part 10a of the tape head 10 includes: a head substrate 20 made of, for example, AlTiC ($Al_2O_3$—TiC), having an element-formation surface 200 perpendicular to the TBS 100; magnetoresistive (MR) elements 21 as read head elements for reading data signals, formed on or above the element-formation surface 200; electromagnetic transducers 22 as write head elements for writing data signals, formed directly above the MR elements 21; an overcoat layer 23 formed on the element-formation surface 200 so as to cover the MR element 21 and the electromagnetic transducer 22; a closure 24 provided on the overcoat layer 23 and adhered to a portion of the upper surface 235 of the overcoat layer 23, the other portion of the upper surface 235 being exposed; and a plurality of terminal electrodes 25 formed in the exposed portion of the upper surface 235 of the overcoat layer 23.

Here, the TBS 100 includes the medium-opposed surface 1000 of the head substrate 20, the medium-opposed surface 1001 of the overcoat layer 23, and the medium-opposed surface 1002 of the closure 24.

The closure 24 is provided with: a first closure part 240 and a second closure part 242, each of which is made of, for example, AlTiC ($Al_2O_3$—TiC); a heating element 26 as a height-adjusting means for adjusting the medium-opposed surface 1002, provided in the vicinity of the medium-opposed surface 1002 and between both of the closure parts; a closure overcoat layer 241 formed of, for example, an insulating material such as $Al_2O_3$ (alumina), $SiO_2$ (silicon dioxide), AlN (aluminum nitride) or DLC, provided so as to cover the heating element 26; and terminal electrodes 27 formed in the exposed portion of the upper surface of the closure overcoat layer 241.

Figure 3A:
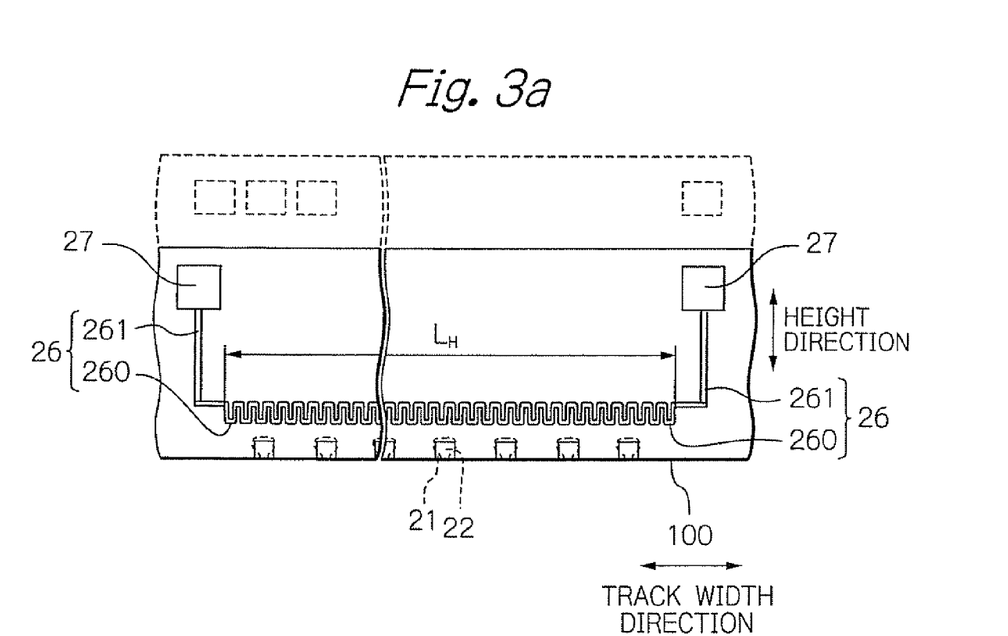
FIG. 3a shows a cross-sectional view taken by plane B presented in FIG. 1b, illustrating a main portion of one embodiment of the thin-film magnetic head according to the present invention.
Figure 3B:
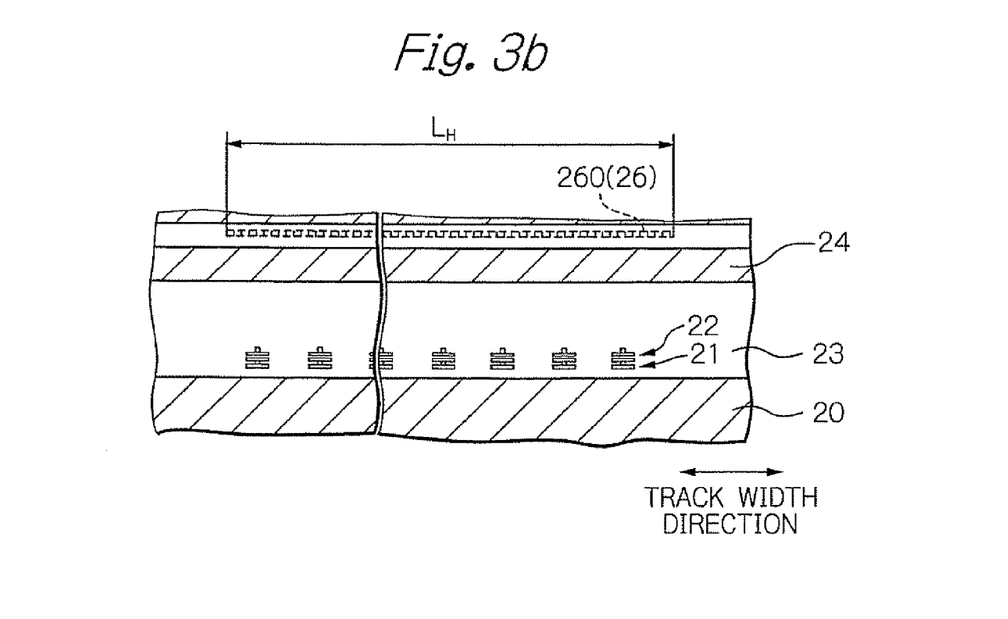
FIG. 3b shows a cross-sectional view taken by plane C presented in FIG. 1b, illustrating a main portion of one embodiment of the thin-film magnetic head according to the present invention.

In the present embodiment, provided on or above the element-formation surface 200 are: a plurality of MR elements 21 and a plurality of electromagnetic transducers 22, both of which are aligned in the track width direction corresponding to a plurality of tracks 110 (FIGS. 3a and 3b). However, in FIG. 2, only one element 21 and one element 22 are presented on the cross-section taken by the plane A of FIG. 2.

The MR elements 21 and electromagnetic transducers 22 are electrically connected to respective terminal electrodes 25. One ends of the MR elements 21 and electromagnetic transducers 22 reach the TBS 100 (the medium-opposed surface 1001) and contact with the magnetic tape 11. In the just-described configuration, during read and write operations, each of the electromagnetic transducers 22 writes data by applying signal magnetic fields to the corresponding track of the running magnetic tape 10, and each of the MR elements 21 reads data by sensing signal magnetic fields from the corresponding track of the running magnetic tape 10.

As shown in FIG. 2, each of the MR elements 21 includes: an MR multilayer 211; and a lower shield layer 210 and an upper shield layer 212, disposed so as to sandwich the MR multilayer therebetween. The upper and lower shield layers 212 and 210 act for preventing the MR multilayer 211 from receiving an external magnetic field as noise. Each of the upper and lower shield layers 212 and 210 is a magnetic layer formed of, for example, FeSiAl (Sendust), NiFe (Permalloy), CoFeNi, CoFe, FeN, FeZrN or CoZrTaCr, or a multilayer of these materials with thickness of approximately 0.5 to 3 Mm (micrometers), made by using, for example, a frame plating method or a sputtering method.

The MR multilayer 211 is a magneto-sensitive portion for sensing signal magnetic fields by utilizing an MR effect, and may be, for example, an anisotropic magnetoresistive (AMR) multilayer that utilizes an AMR effect, a giant magnetoresistive (GMR) multilayer that utilizes a GMR effect, or a tunnel magnetoresistive (TMR) multilayer that utilizes a TMR effect. Further, in the case of the GMR multilayer, the MR multilayer 211 may be a current-in-plane giant magnetoresistive (CIP-GMR) multilayer, or a current-perpendicular-to-plane giant magnetoresistive (CPP-GMR) multilayer. Any MR multilayer 211 utilizing one of these MR effects senses signal magnetic fields from the track 110 of the magnetic tape 11 with high sensitivity. In the case that the MR multilayer 211 is a CPP-GMR multilayer or a TMR multilayer, the upper and lower shield layers 212 and 210 also act as electrodes. Whereas, in the case that the MR multilayer 211 is an AMR multilayer or a CIP-GMR multilayer, insulating layers are provided between the MR multilayer 211 and respective upper and lower shield layers 212 and 210, and further, provided are MR lead layers which are electrically connected with the MR multilayer 211.

As shown in FIG. 2, each of the electromagnetic transducers 22 includes: a lower magnetic pole layer 220; an upper magnetic pole layer 224; a write gap layer 221, the end portion on the TBS 100 side of the write gap layer 221 being sandwiched between the lower magnetic pole layer 220 and the upper magnetic pole layer 224; a write coil layer 222 formed so as to pass through in every turn at least between the upper and lower magnetic pole layers 224 and 220; and a coil insulating layer 223 for isolating the write coil layer 222 from the upper and lower magnetic pole layers 224 and 220.

The lower magnetic pole layer 220 and the upper magnetic pole layer 224 act as a path of the magnetic flux excited by write current flowing through the write coil layer 222. And one end portions of the upper and lower magnetic pole layers 224 and 220 sandwich the end portion on the TBS 100 side of the write gap layer 221. The leakage magnetic field from the sandwiched end portion of the write gap layer 221 is used for writing. In FIG. 2, the write coil layer 222 has a monolayer structure, however, may have a two-or-more-layered structure or a helical coil shape. Further, the upper shield layer 212 and the lower magnetic pole layer 220 may be substituted with one magnetic layer.

The lower magnetic pole layer 220 is a magnetic layer formed of, for example, a soft-magnetic material such as NiFe (Permalloy), CoFeNi, CoFe, FeN FeZrN or CoZrTaCr, or a multilayer of these materials with thickness of approximately 0.5 to 3 μm, made by using, for example, a frame plating method or a sputtering method. The write gap layer 221 is a non-magnetic layer formed of, for example, an insulating material such as $Al_2O_3$ (alumina), $SiO_2$ (silicon dioxide), AlN (aluminum nitride) or DLC (diamond-like carbon) with thickness of approximately 0.01 to 0.05 μm, made by using, for example, a sputtering method or a chemical vapor deposition (CVD) method. The write coil layer 222 is a conductive layer formed of, for example, a conductive material such as Cu with thickness of approximately 0.5 to 5 Mm, made by using, for example, a frame plating method or a sputtering method. The coil insulating layer 223 is, for example, an insulating resin layer formed of, for example, a heat-cured photoresist such as novolac based with thickness of approximately 0.7 to 7 Mm, made by using, for example, a photolithographic method. The upper magnetic pole layer 224 is a magnetic layer formed of, for example, NiFe (Permalloy), CoFeNi, CoFe, FeN FeZrN or CoZrTaCr, or a multilayer of these materials with thickness of approximately 0.5 to 3 μm, made by using, for example, a frame plating method or a sputtering method. The overcoat layer 23 is formed of, for example, stacked non-magnetic insulating materials such as $Al_2O_3$ (alumina), $SiO_2$ (silicon dioxide), AlN (aluminum nitride) or DLC, made by using, for example, a sputtering method or a CVD method.

The terminal electrode 25 includes a lead electrode 250, a base electrode film 251, a bump 252 and a pad 253. The lead electrode 250 is electrically connected with a lead line extending from the MR element 21 or the electromagnetic transducer 22. On the lead electrode 250, formed is the base electrode film 251 with conductivity, and the bump 252 is formed by using a plating method with the base electrode film 251 as an electrode. The base electrode film 251 and the bump 252 are formed of a conductive material such as Cu. The base electrode film 251 has a thickness of, for example, approximately 10 to 200 nm (nanometers), and the bump 252 has a thickness of, for example, approximately 5 to 30 μm. The top end of the bump 252 is exposed in the upper surface 235 of the overcoat layer 23. And on the top end of the bump, formed is the pad 253.

The heating element 26 is a height-control means for controlling the height of the medium-opposed surface 1002, provided near the medium-opposed surface 1002 within the closure 24. In the present embodiment, the heating element 26 includes: a heating portion 260; and lead portions 261 electrically connected to both end portions of the heating portion 260. The lead portions 261 are electrically connected also to terminal electrodes 27. The electric power for heating is supplied from the recording/reproducing and closure-height control circuit 16 (FIG. 1a), through the terminal electrodes 27 and the lead portions 261, to the heating portion 260. When the electric power supply causes the heating element 26 to generate heat, a portion of the closure 24 surrounding the heating element 26 thermally expands. As a result, the medium-opposed surface 1002 protrudes toward the magnetic tape 11. Here, the amount of protrusion of the medium-opposed surface 1002 can be controlled by adjusting the amount of electric power supplied to the heating element 26. Therefore, the magnetic spacing of the first head part 10a can be appropriately controlled by adjusting the degree of contact between the magnetic tape 11 and the portion of the medium-opposed surface 1001 near the ends of the MR elements 21 and electromagnetic transducers 22, as detailed later. The heating element 26 can be positioned arbitrarily within the closure 24, under the condition that the heat generated from the heating element 26 causes the medium-opposed surface 1002 to protrude adequately.

The second head part 10b may include a heating element 26 as well as the first head part 10a. The heating element 26 provided within the second head part 10b can control the magnetic spacing of the second head part 10b independently of that of the first head part 10a. Therefore, in each case whether the magnetic tape 11 runs in the direction of arrow 12 or 13, each of the first head part 10a and the second head part 10b can hold an appropriate magnetic spacing and thus perform adequate write and read operations.

FIG. 3a shows a cross-sectional view taken by plane B presented in FIG. 1b, illustrating a main portion of one embodiment of the thin-film magnetic head according to the present invention. In the cross-section of the closure shown in FIG. 3a, a heating element 26 and terminal electrodes 27 appears, whereas MR elements 21 and electromagnetic transducers 22 are presented by dashed lines. FIG. 3b shows a cross-sectional view taken by plane C presented in FIG. 1b, illustrating a main portion of one embodiment of the thin-film magnetic head according to the present invention. In the cross-section of FIG. 3b, a heating element 26 is presented by dashed lines.

As shown in FIGS. 3a and 3b, a plurality of MR elements 21 and a plurality of electromagnetic transducers 22 are aligned in the track width direction respectively, one ends of which reach the TBS 100 (FIG. 3a). The heating element 26 is a conductive path pattern extending in the track width direction with a predetermined length, and has a heating portion 260 and lead portions 261. The heating portion 260 is a meander pattern of electric resistor material (FIG. 3a). The lead portion 261 is a conductive pattern electrically connected between the heating portion 260 and the terminal electrode 27. The shape of the heating portion 260 is not limited to the meander one, and may be, for example, one line, a U-shape or spiral. The heating portion 260 has a line width of, for example, approximately 1 to 100 μm and a thickness of, for example, approximately 0.01 to 5 Mm; and is formed of a material mainly containing, for example, NiCu, NiCr, Ta, W, Ti, Cu, Au, Al or NiFe. The lead portions 261 may be formed of a conductive material such as Cu or Au, or may be formed integrally with the heating portion 260 by using the same material as the portion 260. The length $L_H$ in the track width direction of the heating portion 260 is preferably the same as or more than the length of the range in the track width direction in which all the MR elements 21 and electromagnetic transducers 22 are aligned; the length $L_H$ may be, for example, approximately 30 to 50 mm.

Figure 4A:
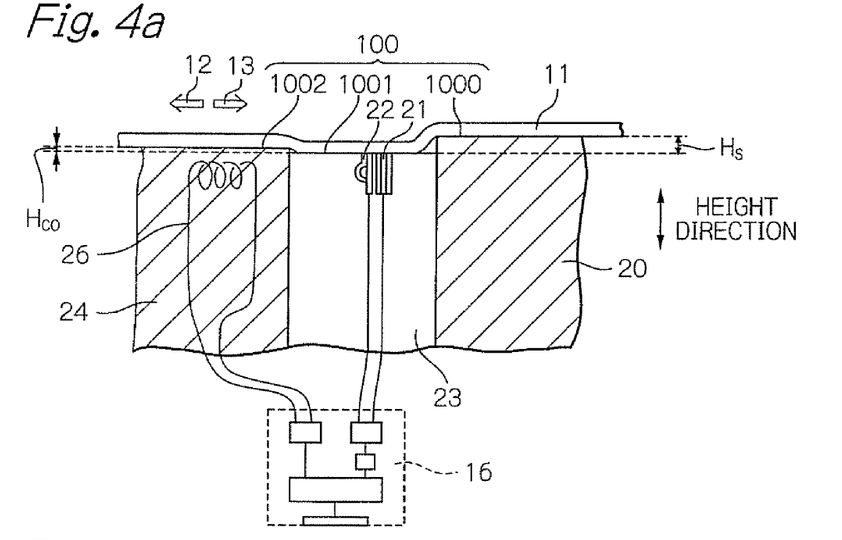
FIGS. 4a and 4b show cross-sectional views taken by plane A presented in FIG. 1b, explaining the principle for controlling the magnetic spacing by using the heating element according to the present invention.
Figure 4B:
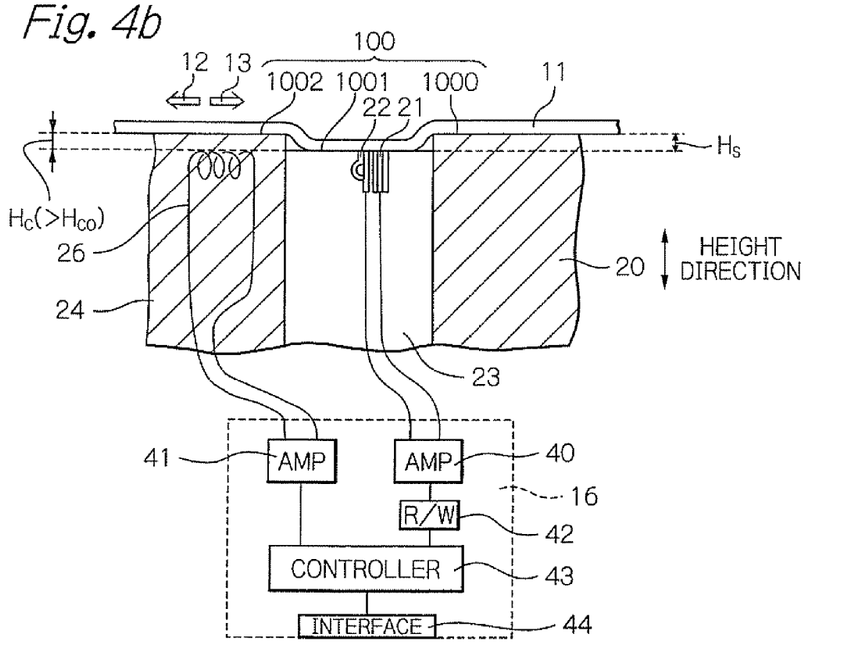

FIGS. 4a and 4b show cross-sectional views taken by plane A presented in FIG. 1b, explaining the principle for controlling the magnetic spacing by using the heating element 26 according to the present invention. Further, FIG. 4b also shows a block diagram schematically illustrating a configuration of the recording/reproducing and closure-height control circuit 16.

Here, the height of the medium-opposed surface of each of the closure 24 and the head substrate 20 is defined as a distance from the medium-opposed surface of the overcoat layer 23 to the target medium-opposed surface in the direction perpendicular to the target medium-opposed surface (in the height direction). From the definition, the more protruded is the whole or a portion of the medium-opposed surface of the closure 24 toward the magnetic recording medium, the higher becomes the whole or a portion of the medium-opposed surface. In FIGS. 4a and 4b, $H_S$ indicates the height of the medium-opposed surface of the head substrate 20. The height of the medium-opposed surface of the closure 24 is indicated by $H_{C0}$ in FIG. 4a, and by $H_C$ in FIG. 4b.

FIG. 4a shows the case that the recording/reproducing and closure-height control circuit 16 does not supply the heating element 26 with electric power. As shown in FIG. 4a, the magnetic tape 11 runs in the direction of arrow 12 or 13, in contact with the TBS 100, which is constituted of the medium-opposed surface 1000 of the head substrate 20, the medium-opposed surface 1001 of the overcoat layer 23, and the medium-opposed surface 1002 of the closure 24. Generally, in a tape head with the just-described structure, the end surface 1001 is usually recessed from the end surfaces 1000 and 1002 in the height direction (in the direction perpendicular to the TBS) by the polishing (the MR height process) during the head manufacturing process for setting the height in the height direction of the MR elements and forming the TBS. That is to say, the end surface 1001 becomes lower than the end surfaces 1000 and 1002. This recess is generated because, generally, the hardness of the overcoat layer is lower than those of the head substrate and the closure.

Further, an error in adhering position usually occurs when adhering the closure 24 on the upper surface of the overcoat layer 23. Therefore, the height Hs of the end surface 1000 of the head substrate 20, which is the distance in the height direction between the end surfaces 1000 and 1001, is in general different from the height $H_C$ of the end surface 1002 of the closure 24, which is the distance in the height direction between the end surfaces 1001 and 1002. Here, in the embodiment of FIG. 4a, the closure 24 is adhered purposely in lower position to satisfy $H_C<H_S$, in consideration of the variation in height of the medium-opposed surface 1002 of the closure 24 caused by the adhering position of the closure 24. As a result, a portion of the medium-opposed surface 1001 near the ends on the TBS 100 side of the MR elements 21 and electromagnetic transducers 22 is contacted to an excessive degree with the running magnetic tape 11. Therefore, the lifetime of the tape head may be likely to be reduced because the magnetic spacing excessively decreases. Further, the performance of the tape head may be degraded due to the increase in frictional heat generated by the contact.

Whereas, FIG. 4b shows the case that the recording/reproducing and closure-height control circuit 16 supplies the heating element 26 with electric power. As shown in FIG. 4b, the supplied electric power causes a portion of the closure 24 surrounding the heating element 26 to thermally expand, due to the heat generated from the element 26. As a result, the medium-opposed surface 1002 protrudes toward the magnetic tape 11. The height $H_C$, which is a height of the medium-opposed surface of the closure 24, becomes higher than the height $H_{C0}$ in the case of supplying no electric power ($H_C>H_{C0}$). Thus, the excessive contact between the running magnetic tape 11 and a portion of the medium-opposed surface 1001 near the ends of the MR elements 21 and electromagnetic transducers 22 becomes moderate. As a result, the magnetic spacing can increase, compared to the case of FIG. 4a, to be a desired value. That is, the magnetic spacing can avoid being affected by the error in adhering position, regardless of the presence of the variation in height of the medium-opposed surface of the closure derived from the variation in adhering position of the closure. The control of the height of the medium-opposed surface 1002 can be performed by adjusting the amount of electric power supplied to the heating element 26 in the recording/reproducing and closure-height control circuit 16. Hereinafter, explained will be the adjustment of the amount of the supplied electric power in the circuit 16.

As shown in FIG. 4b, the recording/reproducing and closure-height control circuit 16 includes a head amplifier 40, a closure-height amplifier 41, a read/write (R/W) channel 42 connected to the head amplifier 40, a controller 43 connected to the R/W channel 42 and the closure-height amplifier 41, and an interface 44 connected to the controller 43.

The head amplifier 40, on the one hand, forms a read output signal by amplifying the read voltage outputted from the MR element 21, and then, sends the read output signal to the R/W channel 42. On the other hand, the head amplifier 40 forms an write current by amplifying the write input signal outputted from the R/W channel 42, and then applies the write current to the electromagnetic transducer 22. The R/W channel 42, on the one hand, forms a data signal by code-demodulating the read output signal outputted from the head amplifier 40, and then sends the data signal to the controller 43; on the other hand, the R/W channel 42 forms an write input signal by code-modulating the data signal outputted from the controller 43, and then sends the write input signal to the head amplifier 40.

The controller 43, on the one hand, executes error correcting to the data signal outputted from the R/W channel 42, and then sends the error-corrected data signal to an external host system through the interface 44; on the other hand, the controller 43 adds an error-correction code to the data signal received from the external host system through the interface 44, and then sends the code-added data signal to the R/W channel 42.

Further, the controller 43 controls the amount of electric power for heating which the closure-height amplifier 41 outputs to the heating element 26, according to the read output signal outputted from the head amplifier 40. In this case, the read output signal may be a data signal or a servo signal. Specifically, the controller 43 first measures the amplitude $V_R$ of the received read output signal, the peak width at half height PW50, or the average value of them; and then estimates the magnetic spacing at that time from the measurement result. Then, the controller 43 sends a control signal to the closure-height amplifier 41 according to the estimate value so that the closure-height amplifier 41 provides the heating element 26 with heating electric power needed to correct the magnetic spacing for a desired one. Then, the closure-height amplifier 41 accordingly supplies the heating element 26 with the needed electric power. As a result, the heating operation of the heating element 26 is controlled, which effects the appropriate control of the height of the medium-opposed surface 1002 of the closure 24.

As described above by using FIGS. 4a and 4b, the magnetic spacing can be controlled responsively and appropriately by adjusting the amount of electric power supplied to the heating element 26, regardless of the presence of the variation in height of the medium-opposed surface 1002 of the closure 24 derived from the variation in adhering position of the closure 24. Further, the height of the medium-opposed surface 1002 can be quickly adjusted by the heating element 26. Therefore, responsive feedback controls of the magnetic spacing can be performed by using the read output.

Figure 5A:
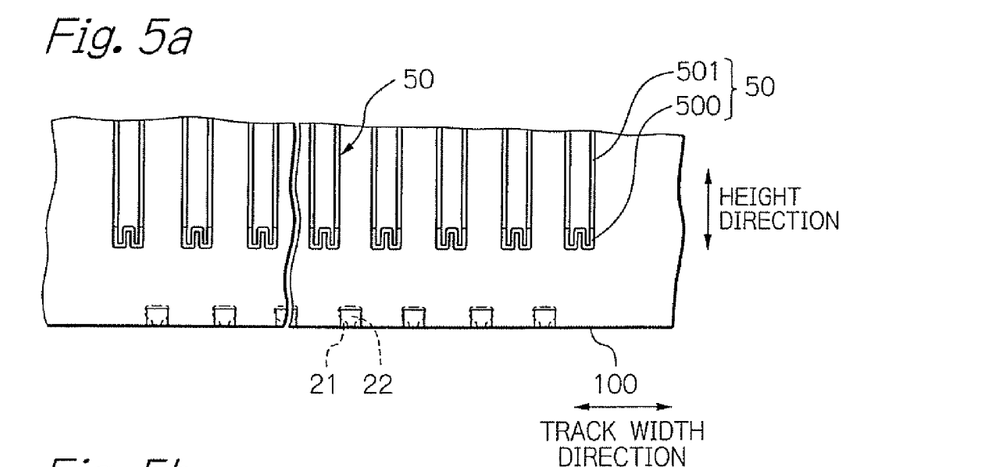
FIGS. 5a to 5f show cross-sectional views schematically illustrating other embodiments of the thin-film magnetic head according to the present invention.
Figure 5B:
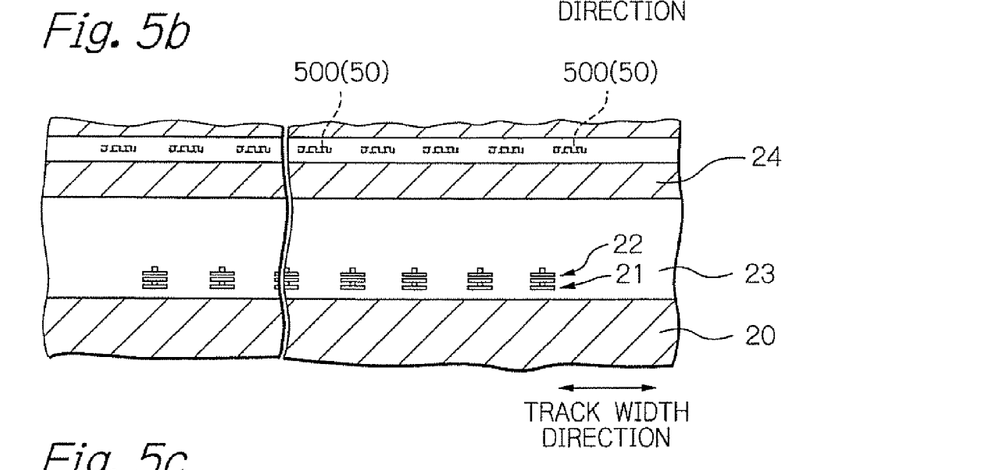
Figure 5C:
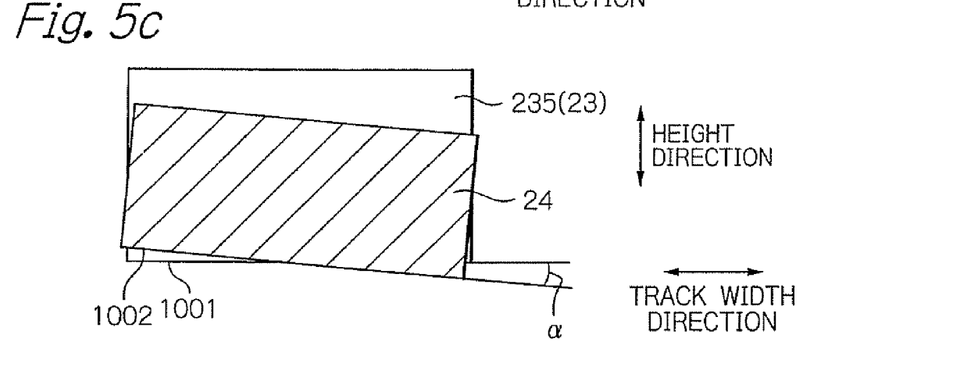
Figure 5D:
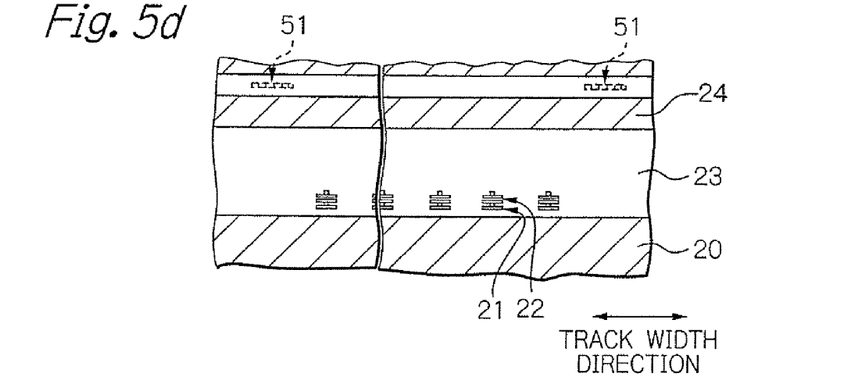
Figure 5E:
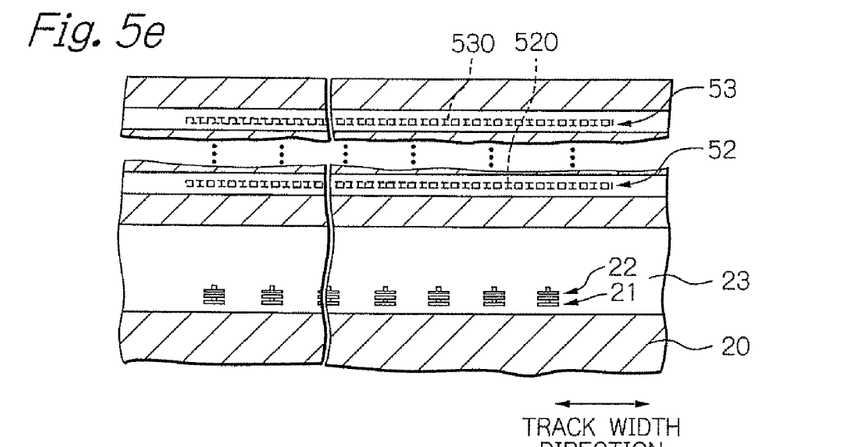

FIGS. 5a to 5f show cross-sectional views schematically illustrating other embodiments of the thin-film magnetic head according to the present invention. FIG. 5a is a cross-section taken by a plane corresponding to B presented in FIG. 1b. And FIGS. 5b, 5d and 5e are cross-sections taken by a plane corresponding to C presented in FIG. 1b.

As shown in FIGS. 5a and 5b, a plurality of heating elements 50 is aligned in the track width direction within the closure 24. Each of the heating elements 50 includes a heating portion 500; and lead portions 501 electrically connected to both end portions of the heating portion 500 and reaching terminal electrodes. Therefore, the heating operations by a plurality of heating portions 500 can be controlled independently of one another. As a result, the distribution of protrusion in the track width direction of the medium-opposed surface can be controlled. That is, controlled can be the magnetic spacing at each position of MR elements 21 and electromagnetic transducers 22, which can compensate the variation in the track width direction of performances of elements. Actually, the use of a plurality of heating elements 50 enables the magnetic spacing at each position of MR elements 21 and electromagnetic transducers 22, for example, to be equalized.

Especially, as shown in FIG. 5c, when adhering the closure 24 on the upper surface 235 of the overcoat layer 23, the closure 24 generally rolls in some degree. As a result, after the subsequent polishing of MR height process, an angle α is formed between the edge of the medium-opposed surface 1001 of the overcoat layer 23 and the edge of the medium-opposed surface 1002 of the closure 24. Regardless of the presence of the angle α, the magnetic spacing can avoid being affected by the error with the angle, by using the embodiment shown in FIGS. 5a and 5b.

Alternatively, as shown in FIG. 5d, two heating elements 51 may be provided away from each other with a distance that is the same as or more than the length of the range in the track width direction in which all the MR elements 21 and electromagnetic transducers 22 are aligned. In this embodiment, the distribution of magnetic spacing in the track width direction can be appropriately controlled by adjusting the heating operation of each of two heating elements 51 independently.

According to FIG. 5e, a plurality of heating elements 52 . . . 53 which respectively have heating portions 520 . . . 530 extending in the track width direction is provided within the closure 24. The heating elements 52 . . . 53 enable more portions of the opposed-medium surface of the closure 24 to be protruded by the heat generated from these heating elements. Further, the distribution of protrusion of the medium-opposed surface in the direction along track can be controlled by adjusting the heating operations of the heating elements 52 . . . 53 independently of one another.

Alternatively, provided may be only the heating element 53, that is, preferably provided is only the heating element extending in the track width direction in an end portion within the closure 24 on the side opposite to the overcoat layer 23. The portion of the medium-opposed surface near the end portion is a portion that strongly contacts with the magnetic tape; therefore, the setting of heating element 53 in the end portion enables the magnetic spacing to be controlled more efficiently. Further, the portion of the medium-opposed surface near the end portion within the closure 24 may preferably have a shape of protrusion in the track width direction, compared to the other portions of the medium-opposed surface of the closure 24. In the embodiment with such a protrusion shape of the closure 24, adjusting the heating operation of the heating element 53 effects the appropriate contact between the magnetic tape and a portion of the medium-opposed surface near the ends of MR elements 21 and electromagnetic transducers 22, with the adequate amount of tensile force in the magnetic tape.

As an alternative, the first heat part 10a and the second head part 10b shown in FIGS. 1a and 1b are preferably provided so that both head parts are opposed in the direction along track; and the closure 24 is positioned outside in each of the heat parts. In this case, the heating element(s) may preferably be provided, extending or aligned in the track width direction in the end portion within each of the closures 24, the end portion being on the side opposite to the overcoat layer 23. The portion of the medium-opposed surface near the end portion is a portion that strongly contacts with the magnetic tape; therefore, the setting of heating element in the end portion in each of the head parts enables the magnetic spacing to be controlled more efficiently. Further, the portion of the medium-opposed surface near the end portion within each of the closures 24 may preferably have a shape of protrusion in the track width direction, compared to the other portions of the medium-opposed surface of the closure 24. In the embodiment with such a protrusion shape of each of the closures 24, adjusting the heating operation of the heating element effects the appropriate contact between the magnetic tape and a portion of the medium-opposed surface near the ends of MR elements 21 and electromagnetic transducers 22, with the adequate amount of tensile force in the magnetic tape.

Figure 5F:
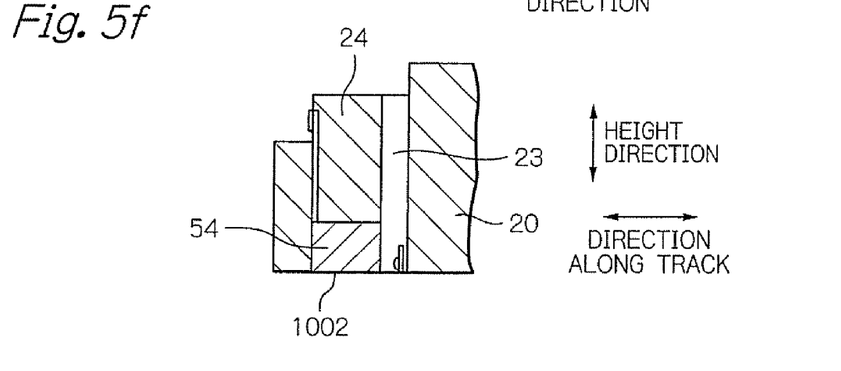

According to FIG. 5f, a piezoelectric element 54 is provided within the closure 24, for adjusting the height of the medium-opposed surface 1002 of the closure 24. The piezoelectric element 54 is formed of, for example, a ferroelectric material such as lead zirconium titanate (PZT) with (inverse) piezoelectric effect, and is deformed by the application of voltage. The piezoelectric element 54 uses its own deformation, and changes the height of the medium-opposed surface 1002 according to the applied voltage. The piezoelectric element 54 may be embedded completely within the closure 24, and cause the medium-opposed surface 1002 to protrude by pushing out the constituent material of the closure 24. Or one end surface of the piezoelectric element 54 may be the medium-opposed surface 1002, and adjust the height of its own end surface. In this embodiment with the piezoelectric element, adjusting the voltage applied to the piezoelectric element 54 enables the magnetic spacing to be controlled appropriately.

Figure 6A:
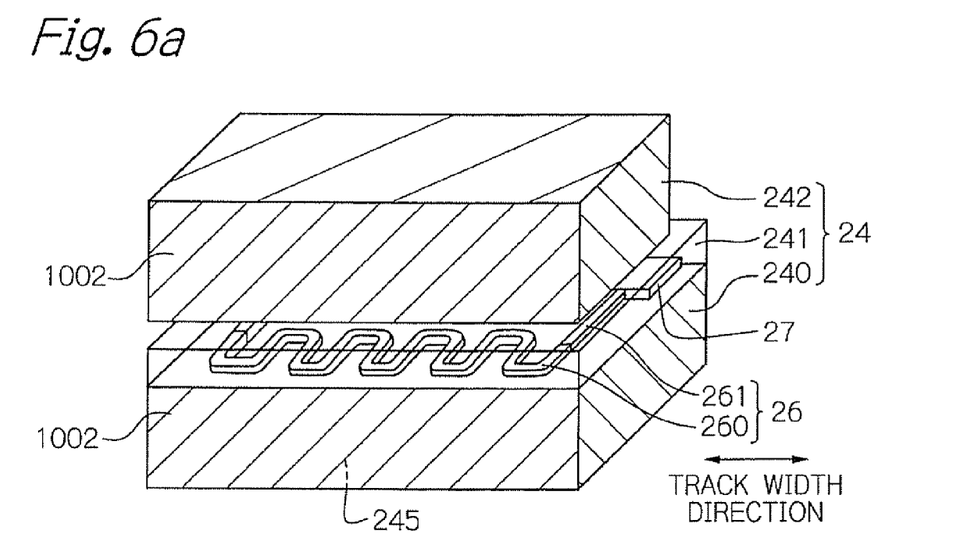
FIGS. 6a and 6b show perspective views for explaining another embodiment of the thin-film magnetic head according to the present invention.
Figure 6B:
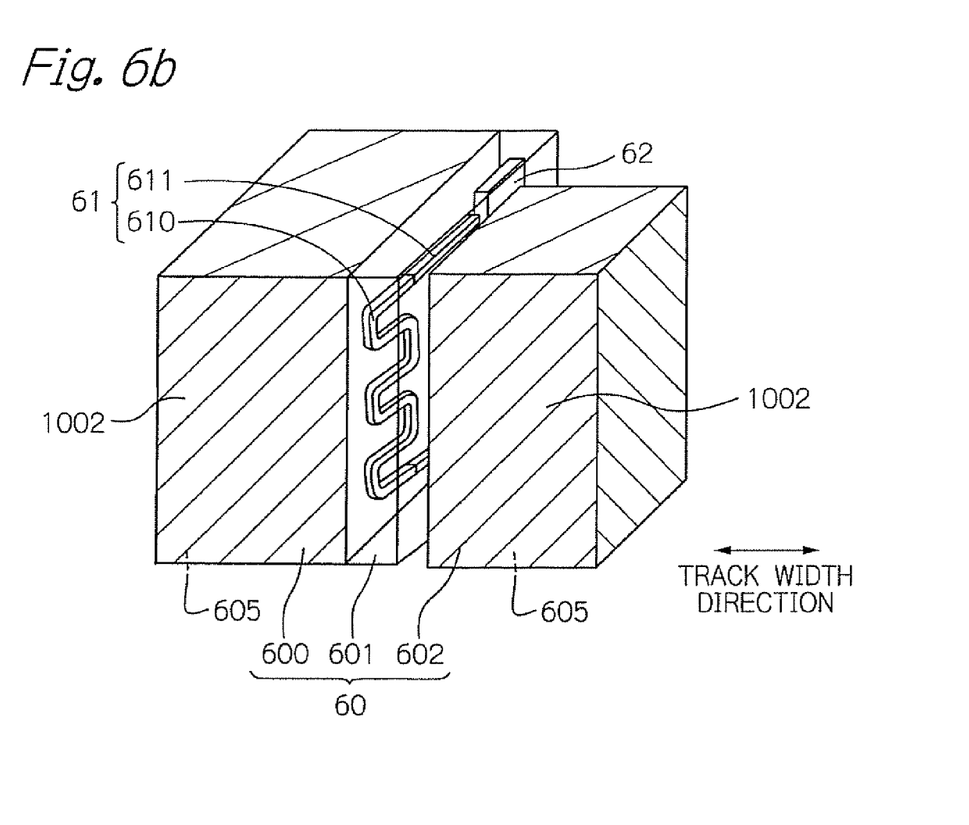

FIGS. 6a and 6b show perspective views for explaining another embodiment of the thin-film magnetic head according to the present invention.

As shown in FIG. 6a, the closure 24 in the embodiment shown in FIG. 2 (FIGS. 3a and 3b) includes: the first closure part 240; the heating element 26 and terminal electrodes 27 formed on the upper surface of the first closure part 240 (the surface on the side opposite to the surface 245 to be adhered to the upper surface of the overcoat layer); a closure overcoat layer 241 provided so as to cover the heating element 26; and the second closure part 242 adhered on a portion of the upper surface of the closure overcoat layer 241 so that the terminal electrodes 27 are exposed. The just-described structure of the closure is suitable for extending the heating portion 260 of the heating element 26 in the track width direction. Further, the structure is also suitable for providing a plurality of heating elements aligned in the track width direction. The closures in the embodiments shown in FIGS. 5a to 5e can also be formed by using the above-described forming method.

Whereas, the embodiment shown in FIG. 6b is different from those shown in FIG. 2 (FIGS. 3a and 3b) and FIGS. 5a to 5e. According to FIG. 6b, the closure 60 includes: the first closure part 600; a heating element 61 and terminal electrodes 62 formed on the side surface of the first closure part 600 (the surface perpendicular to the medium-opposed surface 1002 and the surface 605 to be adhered to the upper surface of the overcoat layer); a closure overcoat layer 601 provided so as to cover the heating element 61; and the second closure part 602 adhered on a portion of the upper surface of the closure overcoat layer 601 so that the terminal electrodes 62 are exposed. The just-described structure of the closure is suitable for extending the heating portion 610 of the heating element 61 in the direction along track. Further, the structure is also suitable for providing a plurality of heating elements aligned in the direction along track. Thus, the structure of the closure enables the distribution of magnetic spacing in the direction along track to be controlled.

FIGS. 7a to 7d show cross-sectional views schematically illustrating other embodiments of the thin-film magnetic head according to the present invention. These figures are cross-sections taken by a plane corresponding to A presented in FIG. 1b.

Figure 7A:
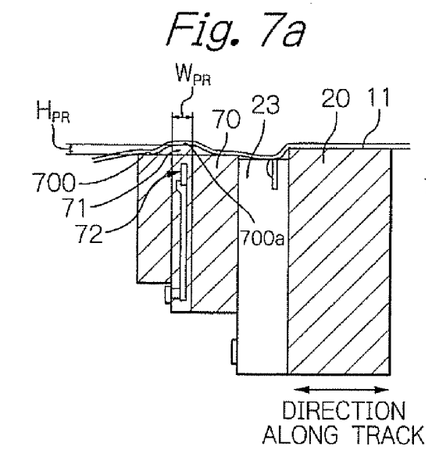
FIGS. 7a to 7d show cross-sectional views schematically illustrating other embodiments of the thin-film magnetic head according to the present invention.

As shown in FIG. 7a, provided is a protruded portion 71 of the medium-opposed surface 700 of the closure 70. The protruded portion 71 is protruded toward the magnetic tape 11, extending in the track width direction. The height of the protruded portion 71, that is, the height of the surface 700a of the protruded portion 71 is larger than its surrounding, the surface 700a being a portion of the medium-opposed surface. Further, the heating element 72 is provided within the closure 70 and on the side opposite to the magnetic tape 11 with respect to the protruded portion 71, for adjusting the height of the protruded portion 71.

Figure 7B:
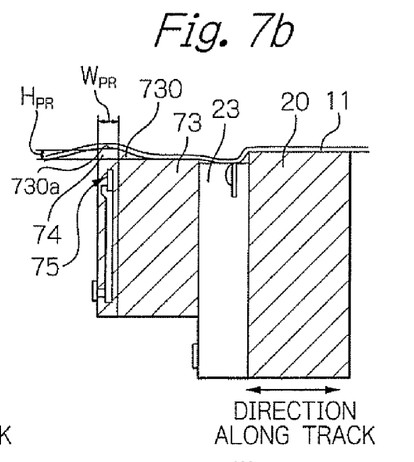

Alternatively, as shown in FIG. 7b, preferably provided is a protruded portion 74, which is the end portion of the medium-opposed surface 730 of the closure 73, the end portion being on the side opposite to the overcoat layer 23. The protruded portion 74 is a portion that contacts much strongly with the magnetic tape 11; therefore, the setting of heating element 75 for adjusting the height of the protruded portion 74 enables the magnetic spacing to be controlled more efficiently. The above-described protruded portions 71 and 74 may be protruded layers stacked on the medium-opposed surfaces of the closures 70 and 73 respectively, formed of, for example, an insulating material such as $Al_2O_3$ or $SiO_2$.

Figure 7C:
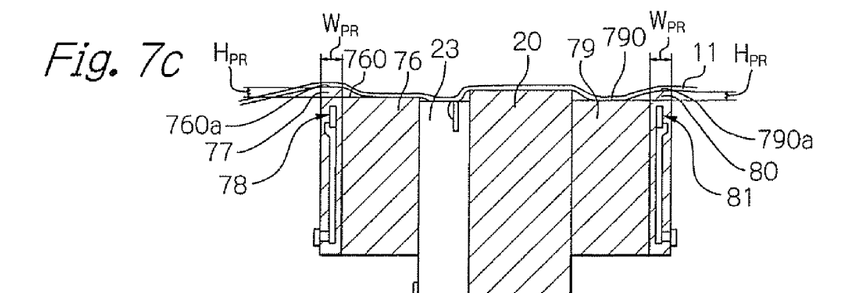

According to FIG. 7c, preferably, an additional closure 79 is further fixed on the end surface of the head substrate 20 opposite to the overcoat layer 23. Further, protruded portions 77 and 80 are provided on the medium-opposed surface 760 of the closure 76 and the medium-opposed surface 790 of the additional closure 79, respectively. The protruded portions 77 and 80 are protruded toward the magnetic tape 11, extending in the track width direction. The heights of the protruded portions 77 and 80, that is, the heights of the surfaces 760a and 790a are larger than their surrounding, the surfaces 760a and 790a being portions of the medium-opposed surfaces, respectively. Further, the heating elements 78 and 81 are provided for adjusting the heights of the protruded portions 77 and 80, respectively. Here, the protruded portions 77 and 80 may be protruded layers stacked on the medium-opposed surfaces of the closure 76 and the additional closure 79 respectively, formed of, for example, an insulating material such as $Al_2O_3$ or $SiO_2$.

Figure 7D:
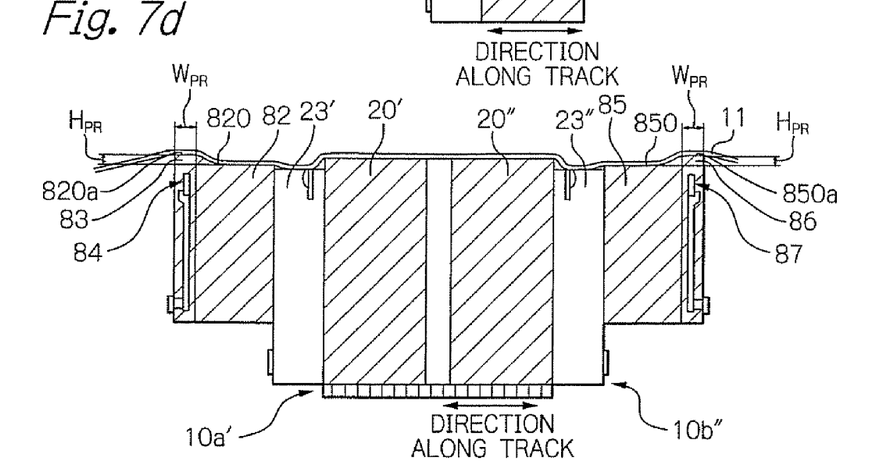

Further, shown in FIG. 7d is another embodiment in which the thin-film magnetic head has the first heat part 10a' and the second head part 10b''; and these head parts 10a' and 10b'' are provided so that both head parts are opposed in the direction along track, and closures 82 and 85 are positioned outside. Also in the just-described embodiment, providing the protruded portions enables the magnetic spacing to be controlled more efficiently.

In FIG. 7d, protruded portions 83 and 86 are provided on the medium-opposed surface 820 of the closure 82 of the first head part 10a' and on the medium-opposed surface 850 of the closure 85 of the second head part 10b'', respectively. The protruded portions 83 and 86 are protruded toward the magnetic tape 11, extending in the track width direction, and the heights of the protruded portions being larger than their surrounding. Further, the heating elements 84 and 87 are provided for adjusting the heights of the protruded portions 83 and 86, respectively. The protruded portions 83 and 86 are positioned in the end portions of the medium-opposed surfaces 820 and 850 of the closures 82 and 85, the end portions being on the side opposite to the overcoat layers 23' and 23'', respectively; and become both ends in the direction along track of the whole head.

The protruded portions 83 and 86 are portions that contact much strongly with the magnetic tape 11; therefore, the setting of heating elements 84 and 87 for adjusting the height of the protruded portions 83 and 86 enables the magnetic spacing to be controlled more efficiently. The above-described protruded portions 83 and 86 may be protruded layers stacked on the medium-opposed surfaces of the closures 23' and 23'' respectively, formed of, for example, an insulating material such as $Al_2O_3$ or $SiO_2$.

The amount of protrusion of each of the protruded portions 71, 74, 77, 80, 83 and 86, that is, each of the heights HR of the surfaces 700a, 730a, 760a, 790a, 820a and 850a from the medium-opposed surfaces 700, 730, 760, 790, 820 and 850 respectively, may be, for example, approximately 0.1 to 10 μm. And the width $W_{PR}$ in the direction along track of each of the protruded portions 71, 74, 77, 80, 83 and 86 may be, for example, approximately 0.1 to 100 Mm. Further, the width in the track width direction of the protruded portions 71, 74, 77, 80, 83 and 86 is, though not shown in the figure, preferably set to be the same as or more than the width of the magnetic tape 11.

Hereinafter, the effect of providing the height-adjusting means for adjusting the height of the closure will be explained by using practical examples in which read operations were performed with use of thin-film magnetic heads according to the present invention.

In the practical examples, tape heads shown in FIG. 2 (FIGS. 3a and 3b) were used to read data. Sixteen head samples were used. The read operations were performed by the MR elements 21 in the second head part 10b positioned on the trailing side, in the case that the magnetic tape 11 runs in the direction of arrow 12 (in the forward direction) in FIGS. 1a and 1b. Whereas, the read operations were performed by the MR elements 21 in the first head part 10a positioned on the trailing side, in the case that the magnetic tape 11 runs in the direction of arrow 13 (in the reverse direction). In the practical examples, the recording/reproducing and closure-height control circuit 16 adjusted the amounts of magnetic spacing in both head parts to be the same as each other, by controlling the heating operation of the heating elements 26 of each of the first and second head parts, in each case of the forward and reverse directions. Meanwhile, as comparative examples, read operations were performed in each of the sixteen head samples, without any control of the magnetic spacing by the heating elements 26, with use of the MR elements 21 of the second head parts 10b in the case of forward direction and the MR elements 21 of the first head parts 10a in the case of reverse direction.

In the practical and comparative examples, MR elements 21 utilizing the AMR effect, in which sense current of 8 mA (milliamperes) was applied, read a predetermined bit pattern written on the magnetic tape 11. Then, the amplitude $V_R$ and the peak width at half height PW50 of read output signal were measured by using a magnetic tester.

Figure 8:
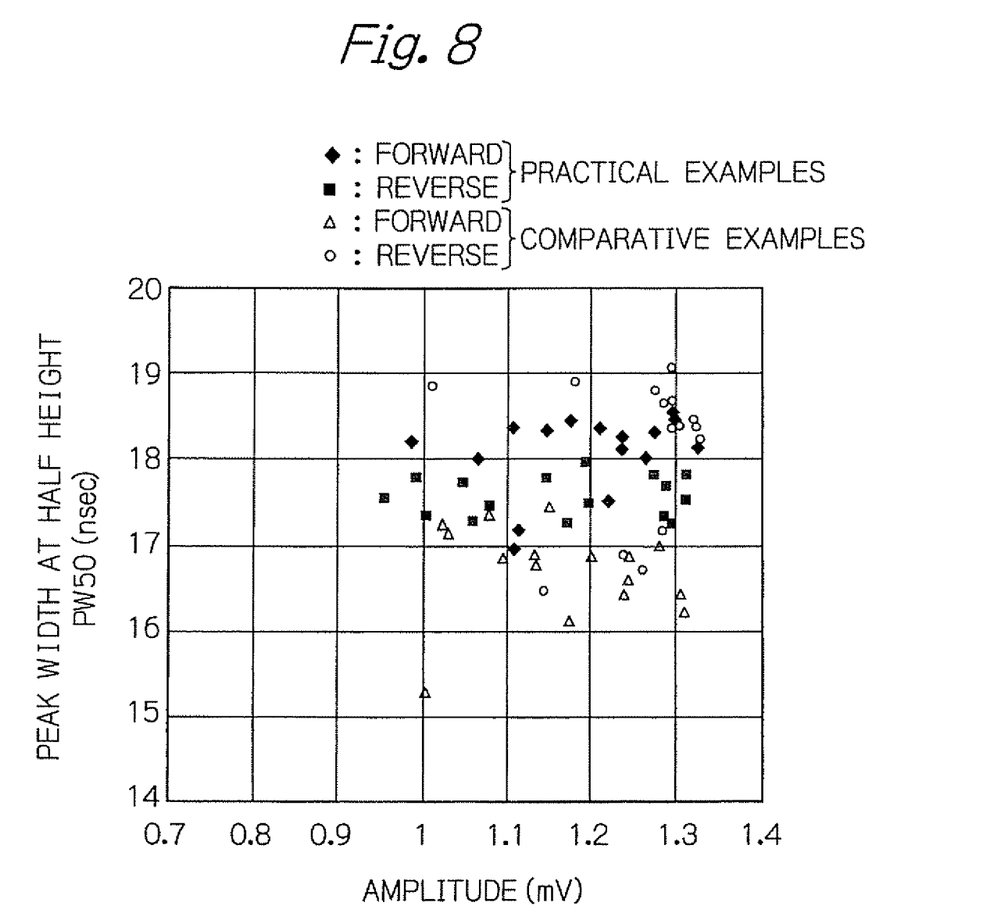
FIG. 8 shows a graph illustrating the amplitude $V_R$ and the peak width at half height PW50 of read output signal in each tape head of the practical and comparative examples.

FIG. 8 shows a graph illustrating the amplitude $V_R$ and the peak width at half height PW50 of read output signal in each tape head of the practical and comparative examples.

As shown in FIG. 8, the values of amplitude $V_R$ of read output signal in the sixteen samples are distributed in the range of about 1 mV (millivolts) to about 1.3 mV. This distribution is derived from the variation in output characteristics of the MR elements 21 in the sixteen samples.

Also as shown in FIG. 8, in the comparative examples, the peak width at half height PW50 of the forward direction is smaller than that of the reverse direction, viewed as a whole. Here, the peak widths at half height PW50 of the reverse direction vary widely in the sixteen samples. The average value in the sixteen samples of the PW50 in the forward direction is 16.7 nsec (nanosecond), whereas the average value in the sixteen samples of the PW50 in the reverse direction is 18.1 nsec, which is significantly different from the above-described average value in the forward direction. Generally, the smaller magnetic spacing is, the smaller becomes the peak width at half height PW50. Therefore, in the comparative examples, the values of magnetic spacing in both cases of the forward and reverse directions are significantly different from each other. On the contrary, in the practical examples, the peak widths at half height PW50 in both cases of the forward and reverse directions are nearly equal to each other, which means that the magnetic spacings in both cases are balanced. In fact, the average value in the sixteen samples of the PW50 in the forward direction is 18.1 nsec, whereas the average value in the sixteen samples of the PW50 in the reverse direction is 17.6 nsec. Thus, the difference between the cases of the forward and reverse directions of the practical samples becomes markedly smaller, compared to the difference of the comparative examples.

As understood from the results of the above-described examples, using the thin-film magnetic head according to the present invention can resolve the variation in magnetic spacing, which the head originally has, by adjusting the height of the medium-opposed surface of the closure.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head comprising:
   at least one head element formed on or above an element-formation surface of a substrate, for reading data from a magnetic recording medium and/or writing data to a magnetic recording medium;
   an overcoat layer formed on the element-formation surface so as to cover said at least one head element; and
   at least one closure adhered to at least a portion of an upper surface of said overcoat layer,
   said at least one closure comprising at least one height-adjusting means for adjusting the height of a medium-opposed surface of the closure,
   said at least one head element having a plurality of read head elements aligned in a track width direction for reading data and a plurality of write head elements aligned in the track width direction for writing data, and
   said at least one height-adjusting means comprising a heating portion with a length in the track width direction being the same as or more than a length of a range in the track width direction in which all the read head elements and the write head elements are aligned.

2. The thin-film magnetic head as claimed in claim 1, wherein said at least one height-adjusting means is at least one heating means provided within the closure.

3. The thin-film magnetic head as claimed in claim 1, wherein said at least one height-adjusting means is at least one piezoelectric element provided within the closure.

4. The thin-film magnetic head as claimed in claim 1, wherein: said at least one head element is a plurality of read head elements aligned in a track width direction for reading data and a plurality of write head elements aligned in the track width direction for writing data; and a plurality of height-adjusting means is aligned in the track width direction within the closure.

5. The thin-film magnetic head as claimed in claim 1, wherein: provided is a portion of a medium-opposed surface of said at least one closure, said portion protruding toward the magnetic recording medium and extending in the track width direction, a height of said portion being larger than its surrounding; and said at least one height-adjusting means is provided for adjusting the height of said portion of the medium-opposed surface.

6. The thin-film magnetic head as claimed in claim 5, wherein said portion of the medium-opposed surface is an end portion of the medium-opposed surface of the closure, said end portion being on a side opposite to said overcoat layer.

7. The thin-film magnetic head as claimed in claim 5, wherein said portion of the medium-opposed surface is a surface of a protruded layer stacked on the medium-opposed surface of the closure.

8. The thin-film magnetic head as claimed in claim 1, wherein: an additional closure is further adhered on an end surface of said substrate, the end surface being on a side opposite to said overcoat layer; provided is a portion of a medium-opposed surface of each of the closure and said additional closure, said portion protruding toward the magnetic recording medium and extending in the track width direction, a height of said portion being larger than its surrounding; and said at least one height-adjusting means is provided within each of the closure and said additional closure, for adjusting the height of said portion of the medium-opposed surface.

9. The thin-film magnetic head as claimed in claim 8, wherein said portion of the medium-opposed surface is an end portion of the medium-opposed surface of each of the closure and said additional closure, said end portion being on a side opposite to said substrate.

10. The thin-film magnetic head as claimed in claim 8, wherein said portion of the medium-opposed surface is a surface of a protruded layer stacked on the medium-opposed surface of each of the closure and said additional closure.

11. A thin-film magnetic head comprising a first head part and a second head part, the first and second head parts opposed to each other in a direction along track, each of the first and second head parts comprising:
  at least one head element formed on or above an element-formation surface of a substrate, for reading data from a magnetic recording medium and/or writing data to a magnetic recording medium;
  an overcoat layer formed on the element-formation surface so as to cover said at least one head element; and
  a closure adhered to at least a portion of an upper surface of said overcoat layer,
  each of the closures of the first and second head parts comprising at least one height-adjusting means for adjusting the height of a medium-opposed surface of the closure,
  said at least one head element having a plurality of read head elements aligned in a track width direction for reading data and a plurality of write head elements aligned in the track width direction for writing data, and
  said at least one height-adjusting means comprising a heating portion with a length in the track width direction being the same as or more than a length of a range in the track width direction in which all the read head elements and the write head elements are aligned.

12. The thin-film magnetic head as claimed in claim 11, wherein said at least one height-adjusting means is at least one heating means provided within said closure.

13. The thin-film magnetic head as claimed in claim 11, wherein provided is a portion of a medium-opposed surface of said closure of each of the first and second head parts, said portion protruding toward the magnetic recording medium and extending in the track width direction, a height of said portion being larger than its surrounding; and said at least one height-adjusting means is provided within said closure of each of the first and second head parts, for adjusting the height of said portion of the medium-opposed surface.

14. The thin-film magnetic head as claimed in claim 13, wherein said portion of the medium-opposed surface is an end portion of the medium-opposed surface of said closure of each of the first and second head parts, said end portion being on a side opposite to said overcoat layer.

15. The thin-film magnetic head as claimed in claim 13, wherein said portion of the medium-opposed surface is a surface of a protruded layer stacked on the medium-opposed surface of said closure of each of the first and second head parts.

16. A magnetic tape apparatus comprising:
  at least one magnetic tape;
  at least two reels for feeding and/or winding said at least one magnetic tape;
  at least one thin-film magnetic head for reading data from said at least one magnetic tape and/or writing data to said at least one magnetic tape; and
  a recording and/or reproducing control circuit for controlling read and/or write operation performed by said at least one thin-film magnetic head,
  the thin-film magnetic head comprising:
  at least one head element formed on or above an element-formation surface of a substrate, for reading data from a magnetic recording medium and/or writing data to a magnetic recording medium;
  an overcoat layer formed on the element-formation surface so as to cover said at least one head element; and
  a closure adhered to at least a portion of an upper surface of said overcoat layer,
  said closure comprising at least one height-adjusting means for adjusting the height of a medium-opposed surface of said closure, and
  said magnetic tape apparatus further comprising a recording/reproducing and closure-height control circuit, for controlling read and/or write operations of the thin-film magnetic head, and further controlling operations of said at least one height-adjusting means.

17. The magnetic tape apparatus as claimed in claim 16, wherein said at least one height-adjusting means is at least one heating means provided within said closure.

18. The magnetic tape apparatus as claimed in claim 16, wherein said at least one height-adjusting means is at least one piezoelectric element provided within said closure.

19. The magnetic tape apparatus as claimed in claim 16, wherein: said at least one head element is a plurality of read head elements aligned in a track width direction for reading data and a plurality of write head elements aligned in the track width direction for writing data; and said at least one height-adjusting means comprises a heating portion with a length in the track width direction being the same as or more than a length of a range in the track width direction in which all the read head elements and the write head elements are aligned.

20. The magnetic tape apparatus as claimed in claim 16, wherein: said at least one head element is a plurality of read head elements aligned in a track width direction for reading data and a plurality of write head elements aligned in the track width direction for writing data; and a plurality of height-adjusting means is aligned in the track width direction within said closure.

21. The magnetic tape apparatus as claimed in claim 16, wherein said at least one height-adjusting means is provided in an end portion of said closure to be extended or aligned in a track width direction, said end portion being on a side opposite to said overcoat layer.

* * * * *